United States Patent [19]

Honma et al.

[11] 4,017,711
[45] Apr. 12, 1977

[54] WELDING MATERIAL FOR LOW TEMPERATURE STEELS

[75] Inventors: Hiroyuki Honma, Sagamihara; Hirofumi Yoshimura, Kitakyushu; Takeshi Nishi, Machida; Rokuro Fujimoto, Yokohama, all of Japan

[73] Assignee: Nippon Steel Corporation, Tokyo, Japan

[22] Filed: Sept. 23, 1975

[21] Appl. No.: 616,074

Related U.S. Application Data

[63] Continuation-in-part of Ser. No. 532,228, Dec. 12, 1974, abandoned, which is a continuation of Ser. No. 400,673, Sept. 25, 1973, abandoned.

[30] Foreign Application Priority Data

Sept. 25, 1972 Japan .............................. 47-95895

[52] U.S. Cl. ................... 219/146; 75/122; 75/126 B; 75/126 C; 75/126 F; 75/126 J; 75/128 A; 75/128 G; 75/128 N; 75/128 W

[51] Int. Cl.² .................. C22C 38/38; C22C 38/58

[58] Field of Search ............ 75/122, 126 B, 126 C, 75/128 A, 128 N, 128 W, 128 G, 126 F, 126 J, 134 M; 219/145, 146

[56] References Cited

UNITED STATES PATENTS

| 2,745,740 | 5/1956 | Jackson et al. | 75/130.5 |
| 2,814,563 | 11/1957 | Dyrkacz et al. | 75/126 J |
| 3,112,195 | 11/1963 | Souresny | 75/126 B |
| 3,151,979 | 10/1964 | Carney et al. | 75/128 A |
| 3,266,876 | 8/1966 | De Long et al. | 29/196.1 |
| 3,645,782 | 2/1972 | Johnson | 219/146 X |
| 3,716,691 | 2/1973 | Baybrook | 219/145 |
| 3,839,022 | 10/1974 | Webster | 75/126 B |

*Primary Examiner*—Arthur J. Steiner
*Attorney, Agent, or Firm*—Toren, McGeady and Stanger

[57] ABSTRACT

A welding material for low temperature steels composed of a core wire or coated core wire, the wire containing 0.05 to 0.5% carbon, 0.15 to 0.75% silicon, 20 to 50% manganese, 4 to 17% chromium, 0.005 to 0.5% nitrogen and more than 0.5 to 10% molybdenum, with the balance being iron and unavoidable impurities.

4 Claims, 2 Drawing Figures

WELDING MATERIAL FOR LOW TEMPERATURE STEELS

CROSS-REFERENCE TO RELATED APPLICATIONS

This application is a continuation-in-part of copending application Ser. No. 532,228, filed on Dec. 12, 1974, which in turn, is a continuation of application Ser. No. 400,673, filed on Sept. 25, 1973, both of which are now abandoned.

BACKGROUND OF THE INVENTION

1. Field of the Invention

The present invention relates to welding materials for low temperature steels, such as, 3.5% Ni steel, 5.5% Ni steel and 9% Ni steel which are used at low temperatures between −100° and −196° C.

2. Description of the Prior Art

As the welding material for 9% Ni steel and 5.5% Ni steel, Inconel alloys of 75 Ni— 15 Cr series are used, and as the welding material for 3.5% Ni steel, austenite stainless steels, such as D308 or D316 and 35 Ni—16 Cr alloys are used. But all of these materials are of high cost because of the high nickel content and are often economically disadvantageous for manufacturing structures.

One of the objects of the present invention is to provide a welding material which improves the impact strength of welded portions of the low temperature steels at low temperatures from −100° to −196° C and which is low in cost and is easy to handle.

SUMMARY OF THE INVENTION

The welding material of the present invention is a high manganese chromium alloy steel in which the high cost nickel is reduced as low as possible and most of the required nickel is replaced by manganese which is also an austenite former.

Specifically, the present invention comprises a core welding wire or coated core welding wire wherein the chemical composition of the wire is:
  C: 0.05 to 0.50%,
  Si: 0.10 to 0.75%,
  Mn: 20 to 30%,
  Cr: 4 to 17%,
  N: 0.005 to 0.50%, and
  Mo: more than 0.5 to 10%
Optionally, the wire may also contain:
  W: not more than 4%,
  Ta: not more than 4%,
  Ni: not more than 10%,
  Balance: iron and unavoidable impurities
The above percents are weight percents based on the weight of the welding material. The above components may be added through the flux or coating material. Thus, it is understood that welding wires conventionally used usually have a flux coating thereon and it is this coating which is referred to herein.

DESCRIPTION OF THE PREFERRED EMBODIMENT

Figure 1:
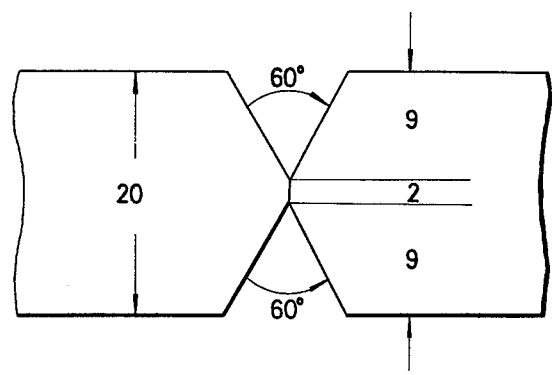
FIG. 1 is a schematic view of a welding groove.

The reasons for the limitations of the above components are as follows:

Carbon is effective to improve the strength of the austenite matrix and for this purpose not less than 0.05% carbon is required, since as the carbon content increases, the austenite matrix becomes stable, but with a carbon content more than 0.50%, the strength becomes too high and the toughness lowers. Further, as shown in Table 1, when 3.5, 5.5 and 9% nickel steels are welded with a welding material containing more than 0.5% carbon, the results of the side bend test becomes worse.

Therefore, the carbon content is limited to 0.05 to 0.50%.

Table 1

| Effect of C on Side Bend Property of 9% Nickel Steel Weldments | | | | | | |
|---|---|---|---|---|---|---|
| Chemical Composition (%) | | | | | | Side Bend Test Result |
| C | Si | Mn | Cr | Mo | N | (180°) |
| 10,10 | 0.31 | 25.4 | 6.7 | 2.2 | 0.021 | Good (no cracks) |
| 0.19 | 0.30 | 25.3 | 6.7 | 2.1 | 0.024 | " |
| 0.30 | 0.32 | 25.3 | 6.9 | 2.2 | 0.024 | " |
| 0.47 | 0.29 | 25.6 | 6.8 | 2.2 | 0.027 | " |
| 0.54 | 0.29 | 25.3 | 6.7 | 2.2 | 0.023 | No good (cracks) |
| 0.65 | 0.30 | 25.4 | 6.8 | 2.1 | 0.022 | " |

Silicon is useful as a deoxidizing agent and 0.10 to 0.75% silicon is necessary for this purpose, and less than 0.10% silicon is not effective for deoxidization, while more than 0.75% silicon is not desirable because it lowers the crack-resistance of the weld metal.

Manganese is an austenite forming element essential for improving the low temperature toughness. In order to obtain a weld metal having an austenite structure stable at low temperatures, the contents of the austenite forming elements, such as, C, N and Ni, and the contents of the ferrite forming elements, such as, Cr and Mo should be selected appropriately, and 20 to 50% manganese is enough. A manganese content of more than 50% lowers the production yield of the core wires in the manufacturing process of the core wires and thus causes increased cost of the welding rods. On the hand, a manganese content of less than 20% can not assure satisfactory low temperature toughness when the material is used for the welding of the low temperature steels.

Regarding the chromium content, with a chromium content less than 4%, sufficient tensile strength can not be obtained, while a chromium content of more than 17% does not provide enough impact strength. Therefore, the chromium content should be in the range of 4 to 17%.

Table 2 illustrates the effects of manganese contents on the mechanical properties of the weld metal of 3.5% Ni steel and Table 3 illustrates the effects of manganese and chromium on the mechanical properties of the weld metal of 9% Ni steel.

Table 2

Effects of Mn on Mechanical Properties of Weld Metal (Welded Material = 3.5% Ni Steel)

| | | Chemical Composition (%) | | | | Mechanical Properties | | |
|---|---|---|---|---|---|---|---|---|
| | C | Si | Mn | Cr | N | Tensile Strength (kg/mm$^2$) | Elongation (%) | Impact* Strength (kg-m) |
| Effects of Mn | 0.07 | 0.29 | 15.7 | 5.1 | 0.062 | 93.8 | 9 | 0.8 |
| | 0.07 | 0.30 | 18.0 | 5.1 | 0.066 | 84.2 | 13 | 1.9 |
| | 0.06 | 0.32 | 19.2 | 5.0 | 0.067 | 71.3 | 20 | 2.8 |
| | 0.06 | 0.30 | 20.4 | 5.2 | 0.070 | 65.1 | 28 | 4.7 |
| | 0.07 | 0.31 | 22.5 | 5.2 | 0.070 | 64.8 | 33 | 6.4 |

*Test Temperature - 107° C

Table 3

Effects of Cr and Mn on Mechanical Properties of Weld Metal (Welded Material : 9% Ni Steel)

| | | Chemical Composition (%) | | | | Mechanical Properties | | |
|---|---|---|---|---|---|---|---|---|
| | C | Si | Mn | Cr | N | Tensile Strength (kg/mm$^2$) | Elongation (%) | Impact Strength* (kg-m) |
| Effects of Mn | 0.18 | 0.33 | 22.8 | 6.7 | 0.062 | 70.2 | 20 | 2.7 |
| | 0.17 | 0.35 | 24.2 | 6.5 | 0.071 | 69.5 | 27 | 3.2 |
| | 0.18 | 0.35 | 25.4 | 6.8 | 0.065 | 68.6 | 31 | 5.3 |
| | 0.18 | 0.32 | 26.7 | 6.9 | 0.068 | 67.3 | 38 | 8.2 |
| | 0.17 | 0.35 | 29.4 | 2.9 | 0.065 | 72.5 | 21 | 2.8 |
| Effects of Cr (I) | 0.18 | 0.34 | 29.2 | 3.6 | 0.072 | 71.4 | 23 | 2.9 |
| | 0.17 | 0.36 | 29.5 | 4.3 | 0.070 | 68.7 | 30 | 4.8 |
| | 0.17 | 0.36 | 29.2 | 5.0 | 0.076 | 68.2 | 36 | 7.8 |
| | 0.15 | 0.32 | 26.2 | 15.2 | 0.076 | 68.8 | 37 | 7.6 |
| Effects of Cr (II) | 0.16 | 0.33 | 26.1 | 16.5 | 0.075 | 70.8 | 32 | 5.0 |
| | 0.16 | 0.31 | 26.2 | 17.4 | 0.81 | 72.5 | 22 | 3.1 |
| | 0.17 | 0.29 | 26.3 | 18.2 | 0.083 | 76.4 | 19 | 1.9 |

Nitrogen, in a manner similar to carbon, stabilizes the austenite matrix and is effective to increase the strength. For this purpose, 0.005% or more nitrogen is necessary, but more than 0.5% nitrogen remarkably lowers the impact strength. Therefore, the nitrogen content is limited to a range from 0.005 to 0.5%.

Another feature of the present invention is that one or more of W and Ta are added in order to improve the strength or crack-resistance of the weld metal, and Ni is added in order to improve the low temperature toughness of the weld metal.

Molybdenum is effective to improve the strength and the crack-resistance of the weld metal, and it is most desirable to add it to submerged arc welding materials. However, a molybdenum content more than 10% lowers the increase of the tensile strength and lowers the impact strength remarkably. Thus the upper limit is set as 10%.

On the other hand, a molybdenum content of less than 0.5% does not satisfy, as shown in Table 4, the standard for the weld metal strength of 9% Ni steel in ASME 1380-5, i.e., ≧ 95,000 psi (66.8 kg/mm$^2$). Thus the lower limit thereof is set as more than 0.5%.

Further, as shown in Table 4, the addition of more than 0.5% molybdenum increases the impact strength of the fusion line at lower temperatures at a so-called "different material joint" as in the present invention. The Table shows also the weldment of 9% Ni steel. Although these materials show surely a good toughness when the position of notch lies at the middle of the weld metal, they show a value lower than the standard in ASME of 3.5 kg-m at −196° C when the position of notch lies at the fusion line. Moreover, even when more than 0.5% of molybdenum is added to the alloys No. 8 and 9, whose carbon content is more than 0.5%, the value becomes less than 3.5 kg-m.

Thus, it is clear that, in order to obtain a sufficient low temperature toughness as well as the fusion line in the case of a different material joint of, for instance, 9% Ni steel as in the present invention, the welding material should contain more than 0.5% Mo while restricting the carbon content to less than 0.5%.

Table 4

Effect of C and Mo on Mechanical Properties of 9% Nickel Steel Weldments

| | No. | Chemical Composition (%) | | | | | | | v$^E$ -196 (kg-m) | |
|---|---|---|---|---|---|---|---|---|---|---|
| | | C | Si | Mn | Cr | Mo | N | Ni | Weld Metal | Fusion Line |
| Comparison Material | 1. | 0.25 | 0.35 | 25.6 | 6.2 | — | 0.025 | — | 7.0 | 3.0 |
| | 2. | 0.45 | 0.39 | 25.2 | 6.3 | — | 0.028 | — | 6.8 | 2.8 |
| Inventive Material | 3. | 0.25 | 0.38 | 25.4 | 6.0 | 0.6 | 0.023 | — | 7.1 | 5.6 |
| | 4. | 0.24 | 0.37 | 25.4 | 6.0 | 1.7 | 0.025 | — | 6.7 | 5.3 |
| | 5. | 0.45 | 0.39 | 25.3 | 6.1 | 1.8 | 0.027 | — | 6.2 | 4.5 |
| Comparison Material | 6. | 0.54 | 0.39 | 25.4 | 6.2 | 1.7 | 0.026 | — | 5.5 | 3.2 |
| | 7. | 0.68 | 0.39 | 25.4 | 6.2 | 1.8 | 0.025 | — | 4.6 | 2.9 |
| Comparison Material | 8. | 0.62 | — | 21.1 | — | — | — | 11.2 | 5.1 | 1.9 |
| | 9. | 0.62 | — | 21.1 | — | — | — | 22.4 | 5.5 | 2.1 |
| Comparison Material | 10. | 0.62 | — | 21.2 | — | 1.7 | — | 11.2 | 4.8 | 2.0 |
| | 11. | 0.62 | — | 21.3 | — | 1.8 | — | 22.4 | 5.2 | 2.3 |

Tungsten and tantalum, similarly as molybdenum, are effective to strengthen the austenite matrix, but addition of these materials in excess causes embrittlement of the metal. Therefore, these elements are used as a supplement in an amount not more than 4%.

Nickel is an austenite forming element and is effective to improve the toughness, but an excessive addition of nickel will cause increases in the production cost. Therefore, the nickel content is limited to 10% as its upper limit.

Table 5 shows the effects of molybdenum on the mechanical properties of the weld metal of 9% Ni steel, and also illustrates the effects of tungsten, tantalum and nickel.

EXAMPLE 1

A steel having the composition shown in Table 6 was hot worked, and drawn into 4mm diameter core wires, and each wire was coated with coating material (SiO: 13%, $TiO_2$: 47%, $Al_2O_3$: 3%, CaO: 13%, $K_2O$: 7%, CaF: 8% and $CO_2$: 9%) to obtain coated welding rods of 6.4mm outer diameter. Welding materials of 3.5% Ni steel, 5.5% Ni steel, and 9% Ni steel, all of 20mm thickness were provided with a welding groove of 60° and butt welded using the above welding rods under the conditions shown in Table 7.

Results of the tests on the mechanical properties of the welded portions are shown in Table 8, and it is clear that good mechanical properties comparable to those obtained by Inconel alloys are obtained by using the present inventive welding rods.

Table 5

Effect of Mo, W, Ta and Ni on Mechanical Properties of Weld Metal (Welded Material : 9% Ni Steel)

| | Chemical Composition (%) | | | | | | | Mechanical Properties | | | |
|---|---|---|---|---|---|---|---|---|---|---|---|
| | C | Si | Mn | Cr | No | N | Strength Others | Tensile tion Strength ($kg/mm^2$) | Elongation (%) | Impact Cracking (kg-m) | Bead** (%) |
| Effects of Mo | 0.12 | 0.30 | 30.2 | 8.5 | 0.5 | 0.062 | — | 65.2 | 33 | 10.5 | 9 |
| | 0.12 | 0.33 | 30.6 | 0.3 | 1.3 | 0.069 | — | 67.0 | 35 | 9.9 | 5 |
| | 0.11 | 0.33 | 30.1 | 8.7 | 2.2 | 0.070 | — | 67.6 | 34 | 9.9 | 0 |
| | 0.10 | 0.32 | 30.4 | 8.4 | 3.7 | 0.070 | — | 68.4 | 32 | 8.0 | 0 |
| | 0.10 | 0.31 | 30.2 | 8.2 | 5.6 | 0.072 | — | 70.4 | 31 | 6.5 | 0 |
| | 0.11 | 0.29 | 30.3 | 8.2 | 9.0 | 0.074 | — | 71.1 | 30 | 5.3 | 0 |
| | 0.10 | 0.30 | 30.5 | 8.6 | 9.7 | 0.069 | — | 71.5 | 30 | 5.4 | 0 |
| | 0.12 | 0.30 | 30.3 | 8.4 | 10.5 | 0.072 | — | 71.8 | 27 | 3.2 | 0 |
| | 0.11 | 0.32 | 30.4 | 8.3 | 11.2 | 0.071 | — | 72.0 | 25 | 2.8 | 0 |
| Effects of W | 0.14 | 0.33 | 30.5 | 8.8 | — | 0.069 | W 1.3 | 38.3 | 31 | 7.0 | 0 |
| | 0.12 | 0.31 | 30.6 | 8.6 | — | 0.072 | W 3.2 | 70.2 | 31 | 3.1 | 0 |
| | 0.14 | 0.31 | 30.6 | 8.5 | — | 0.074 | W 4.5 | 72.6 | 24 | 3.0 | 0 |
| Effects of Ta | 0.14 | 0.33 | 30.4 | 8.3 | — | 0.070 | Ta 1.2 | 68.0 | 34 | 8.5 | 0 |
| | 0.13 | 0.32 | 30.5 | 8.2 | — | 0.075 | Ta 1.9 | 68.6 | 33 | 8.3 | 0 |
| | 0.14 | 0.32 | 30.4 | 8.2 | — | 0.071 | Ta 4.4 | 71.9 | 30 | 2.9 | 0 |
| Effects of Ni | 0.15 | 0.28 | 35.6 | 7.5 | 1.6 | 0.082 | Ni 1.2 | 67.2 | 35 | 10.8 | 0 |
| | 0.16 | 0.29 | 35.6 | 7.4 | 1.6 | 0.080 | Ni 2.0 | 67.0 | 35 | 11.3 | 5 |
| | 0.15 | 0.29 | 35.4 | 7.4 | 1.7 | 0.083 | Ni 3.5 | 67.0 | 36 | 11.6 | 0 |

*Test Temperature - 196° C
**Crater cracking is not included. Test method is in accordance with JIS 0-type crack testing method.

The present invention is described in the following examples, referring to the attached drawings.

FIG. 1 shows a welding groove referred to in Table 12, and

Figure 2:
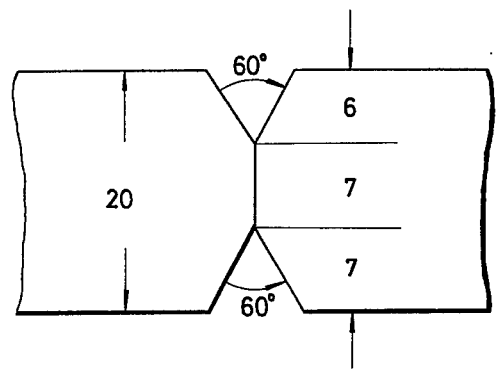
FIG. 2 is a view similar to that of FIG. 1 of another welding groove.

FIG. 2 shows a welding groove referred to in Table 15.

Table 6

| Composition of Welding Core Wires (weight %) | | | | |
|---|---|---|---|---|
| C | Si | Mn | Cr | N |
| 0.14 | 0.20 | 33.6 | 8.7 | 0.061 |

Table 7

| Welding Conditions | | | | |
|---|---|---|---|---|
| Welding current | Number of Layers | Pre- Heating | Temperature between Passes | Heat Treatment |
| 130 – 160A | 12 | Mo | not more than 100° C | as welded |

Table 8

| Welded Materials | Chemical Compositions (%) | | | | | Mechanical Properties | | |
|---|---|---|---|---|---|---|---|---|
| | C | Si | Mn | Cr | N | Tensile Strength (kg/mm$^2$) | Elongation (%) | Impact Strength (kg-m) |
| 3.5% Ni Steel | 0.15 | 0.33 | 31.3 | 6.2 | 0.079 | 63.2 | 38 | 10.9* |
| 5.5% Ni Steel | 0.12 | 0.32 | 32.1 | 8.3 | 0.077 | 67.4 | 35 | 10.6** |
| 9 % Ni Steel | 0.12 | 0.32 | 32.2 | 8.2 | 0.073 | 67.5 | 32 | 8.9** |

*Test Temperature - 107° C
**Test Temperature - 196° C

EXAMPLE 2

The core wires used in Example 1 were coated with the coating materials containing Mn, Mo, Ni and Ta as shown in Table 9 to obtain coated wlding rods of 6.4mm outer diameter. A welding material of 9% Ni steel of 20mm thickness was provided with a welding groove of 60° and butt welded using the above welding rod under the same conditions as in Example 1. The chemical compositions and the mechanical properties of the deposited metals are shown in Table 10. As is clear from the table, the mechanical properties, particularly the impact strength, are excellent when the welding is effected using the present inventive welding materials.

EXAMPLE 3

MIG welding shielded with Ar + O$_2$ gas was conducted on a 9% Ni steel under the conditions shown in Table 12, using the 1.6mm diameter wire having the chemical composition shown in Table 11. Results of the tests on the mechanical properties are shown in Table 13, which show that excellent strength and toughness can be obtained by the present invention, and that the welding material of the present invention is also very advantageous for MIG welding.

EXAMPLE 4

4mm diameter wires were prepared by hot working and drawing from a steel having the chemical composition shown in Table 14 and a submerged welding was conducted on a 9% Ni steel using the flux (SiO$_2$: 31%, CaO: 33%, MgO: 21%, Al$_2$O$_3$: 9%, others: 6%) under the conditions shown in Table 15. Results of the tests on the mechanical properties of the weld metal are shown in Table 16, which indicates no crater crack was observed and both the strength and toughness were good.

Table 9

| Welding Rods | Chemical Composition of Coating Material (Weight %) | | | | | | | | | | |
|---|---|---|---|---|---|---|---|---|---|---|---|
| | Fluxes | | | | | | | Additives | | | |
| | SiO$_2$ | TiO$_2$ | Al$_2$O$_3$ | CaO | K$_2$O | CaF$_2$ | CO$_2$ | Mn | Mo | Ni | Ta |
| 1 | 12.9 | 38.1 | 3.2 | 13.0 | 7.0 | 8.5 | 11.3 | 6.0 | — | — | — |
| 2 | 12.9 | 38.1 | 3.2 | 13.0 | 7.0 | 8.5 | 11.3 | — | 6.0 | — | — |
| 3 | 11.4 | 38.1 | 3.2 | 11.5 | 7.0 | 7.5 | 11.3 | — | 6.0 | 4.0 | — |
| 4 | 12.4 | 38.1 | 3.2 | 12.5 | 7.0 | 7.5 | 11.3 | — | — | — | 8.0 |

Table 10

| Welding Rods | Chemical Compositions and Mechanical Properties of Weld Metals | | | | | | | | | |
|---|---|---|---|---|---|---|---|---|---|---|
| | Chemical Composition (%) | | | | | | | Mechanical Properties | | |
| | C | Si | Mn | Cr | Mo | Ni | Ta | N | Tensile strength (kg/mm$^2$) | Elongation (%) | Impact Strength (kg-m)* |
| 1 | 0.13 | 0.35 | 34.2 | 8.2 | — | — | — | 0.075 | 67.2 | 36 | 10.3 |
| 2 | 0.12 | 0.30 | 32.3 | 8.3 | 1.8 | — | — | 0.074 | 68.8 | 33 | 9.4 |
| 3 | 0.13 | 0.33 | 32.3 | 8.3 | 1.8 | 1.3 | — | 0.072 | 67.5 | 35 | 10.1 |
| 4 | 0.12 | 0.30 | 32.1 | 8.2 | — | — | 2.3 | 0.079 | 68.2 | 32 | 9.8 |

*Test Temperature - 196° C

Table 11

| Chemical Composition of Welding Wire used in MIG Welding (weight %) | | | | | |
|---|---|---|---|---|---|
| C | Si | Mn | Cr | Mo | N |
| 0.15 | 0.35 | 35.0 | 9.5 | 2.1 | 0.063 |

Table 12

| | Welding Groove of 9% Ni Steel to be welded and Conditions of MIG Welding | | | | | |
|---|---|---|---|---|---|---|
| Groove | Wire Diameter (mm$\phi$) | Shielding Gas (l/min.) | Current (A) | Voltage (V) | Speed (cm/min.) | Temperature between Passes |
| See FIG. 1 | 1.6 | 25 (Ar+2%O$_2$) | 230–280 | 24–27 | 30 | Not higher than 100° C |

Table 13

| | Chemical Composition and Mechanical Properties of MIG Weld Metal | | | | | | | | |
|---|---|---|---|---|---|---|---|---|---|
| | Chemical Composition | | | | | | Mechanical Properties | | |
| C | Si | Mn | Cr | Mo | N | | Tensile Strength (kg/mm$^2$) | Elongation (%) | Impact Strength (kg-m)* |
| 0.14 | 0.26 | 33.5 | 8.9 | 2.0 | 0.070 | | 67.9 | 38 | 10.2 |

*Test Temperature - 196° C

Table 14

| | Chemical Composition of Core Wires for Submerged Welding (weight %) | | | | | |
|---|---|---|---|---|---|---|
| Core Wires | C | Si | Mn | Cr | Mo | N |
| 1 | 0.14 | 0.18 | 40.7 | 10.2 | 6.9 | 0.025 |
| 2 | 0.13 | 0.15 | 40.5 | 10.1 | 9.5 | 0.028 |

Table 15

| | Welding Groove of 9% Ni Steel to be welded and Conditions of Submerged Welding Conditions | | | | |
|---|---|---|---|---|---|
| Groove | Wire Diameter (mm) | Current (A) | Voltage (V) | Speed (cm/min.) | Temperature between Passes |
| See FIG. 2 | 4.0 | 500 | 27–30 | 30 | Not higher than 100° C |

Table 16

| | Chemical Composition and Mechanical Properties of Submerged Weld Metal | | | | | | | | |
|---|---|---|---|---|---|---|---|---|---|
| | Chemical Composition | | | | | | Mechanical Properties | | |
| Core Wires | C | Si | Mn | Cr | Mo | N | Tensile Strength (kg/mm$^2$) | Elongation (%) | Impact Strength (kg-m)* |
| 1 | 0.12 | 0.27 | 28.3 | 6.3 | 4.1 | 0.029 | 71.3 | 37 | 8.9 |
| 2 | 0.12 | 0.30 | 28.5 | 6.5 | 6.0 | 0.033 | 72.6 | 31 | 6.2 |

*Test Temperature - 196° C

What is claimed is:

1. A welding material for low temperature steels comprising a core wire consisting essentially of 0.05 to 0.5% carbon, 0.15 to 0.75% silicon, 20 to 50% manganese, 4 to 17% chromium, 0.005 to 0.5% nitrogen, and more than 0.5 to 10% molybdenum, with the balance being iron and unavoidable impurities, all weights being based on the total weight of the welding material.

2. The welding material of claim 1, wherein the material is a flux-coated wire.

3. A welding material for low temperature steels comprising a core wire consisting essentially of 0.05 to 0.5% carbon, 0.15 to 0.75% silicon, 20 to 50% manganese, 4 to 17% chromium, 0.005 to 0.5% nitrogen, and 0.5 to 10% molybdenum, and one or more elements selected from the group consisting of not more than 4% tantalum, and not more than 10% nickel, with the balance being iron and unavoidable impurities, all weights being based on the total weight of the welding material.

4. The welding material of claim 3, wherein the material is a flux-coated electrode.

* * * * *